No. 743,652.

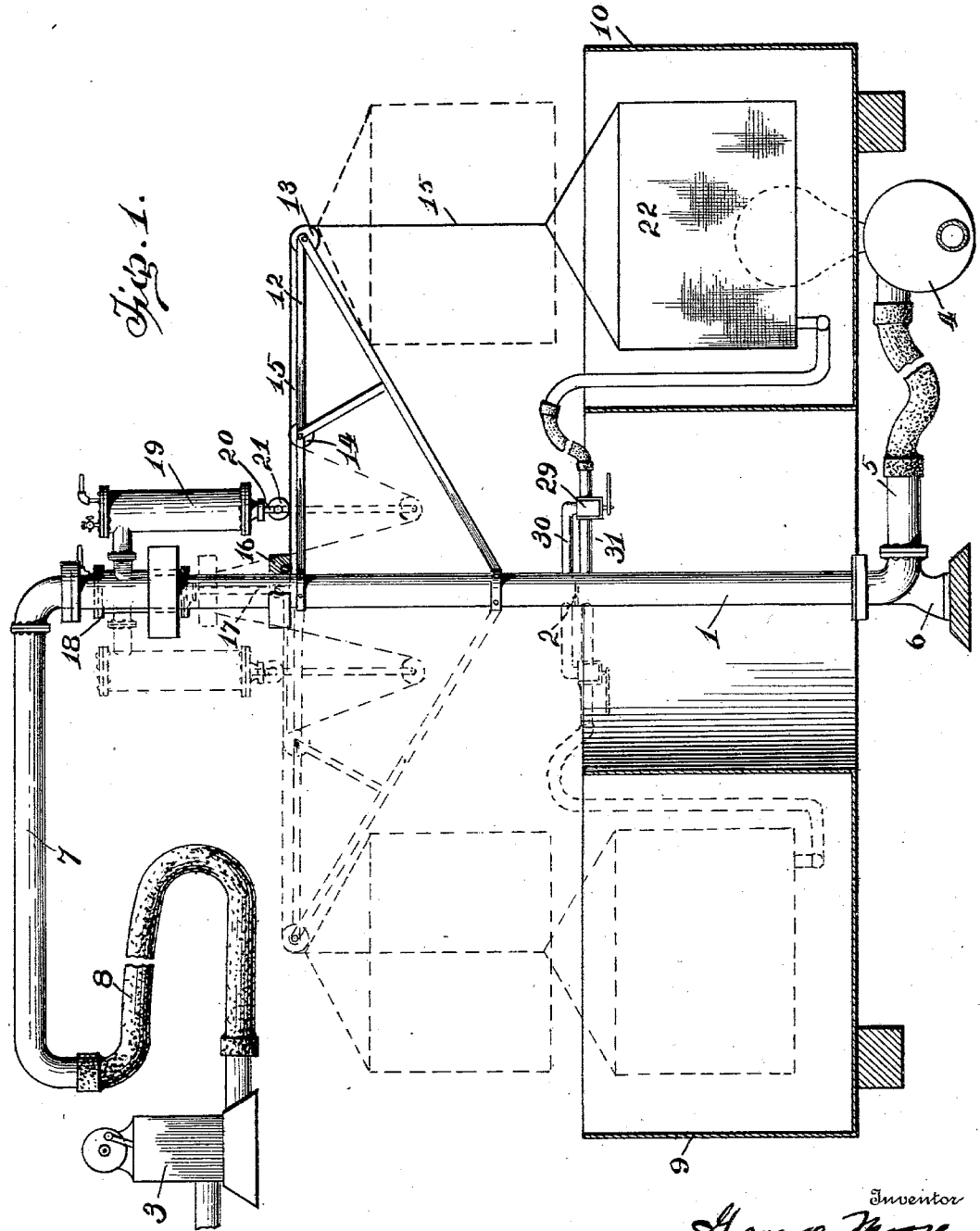

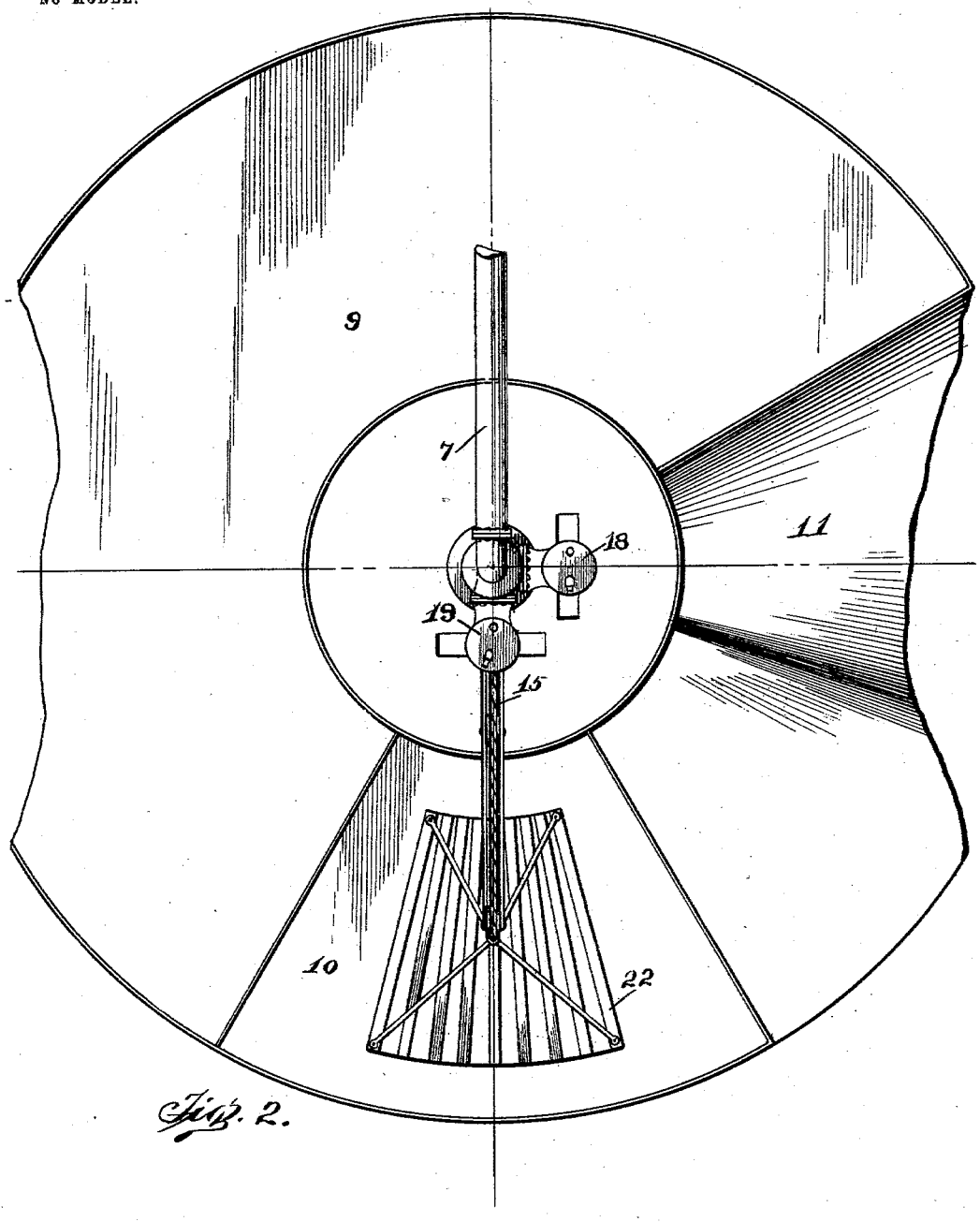

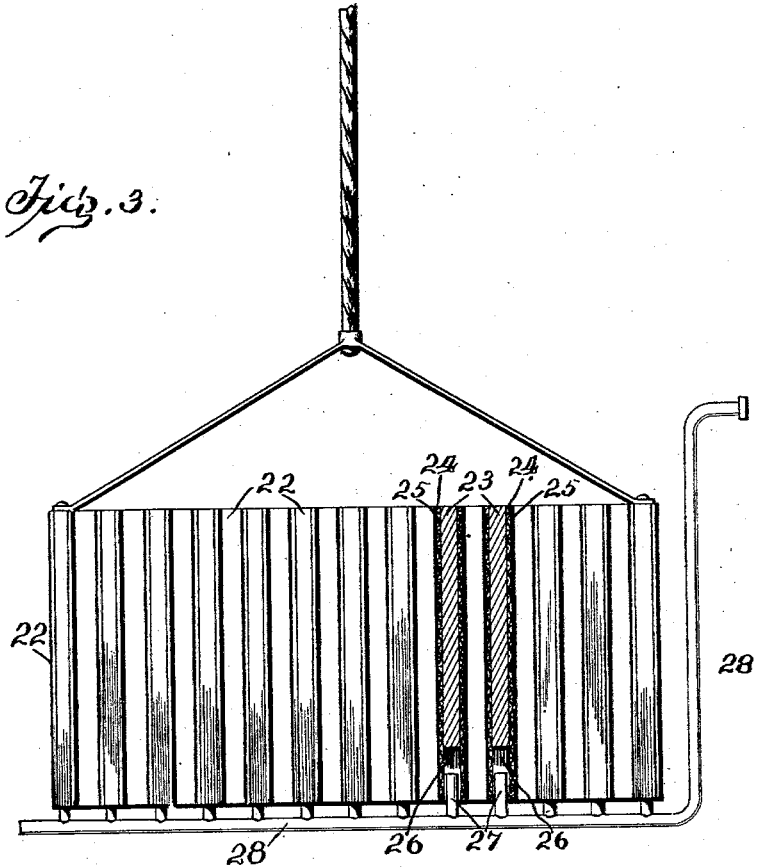

Patented November 10, 1903.

UNITED STATES PATENT OFFICE.

GEORGE MOORE, OF SALT LAKE CITY, UTAH.

ROTARY FILTER.

SPECIFICATION forming part of Letters Patent No. 743,652, dated November 10, 1903.

Application filed October 30, 1902. Serial No. 129,431. (No model.)

*To all whom it may concern:*

Be it known that I, GEORGE MOORE, a citizen of the United States, residing at Salt Lake City, in the county of Salt Lake and State of Utah, have invented certain new and useful Improvements in Rotary Filters; and I do hereby declare the following to be a full, clear, and exact description of the invention, such as will enable others skilled in the art to which it appertains to make and use the same.

The present invention relates to improvements in filtering systems; and the object in view is the production of mechanism whereby a filtering operation may be accomplished with the least possible loss of time, the filtering medium being maintained in a comparatively clean condition.

A further object is the provision of mechanism for subjecting a filtering medium to a filtering operation, cleansing the same by a washing operation, and then dislocating from the surface of the same all solids collected during the filtering operation.

With this and other objects in view the invention consists, in combination with a suitable series of tanks arranged in a circle, of a filtering medium, means for successively introducing said filtering medium into and removing it from said tanks, means for subjecting the filtering medium to a drawing action, and means for further subjecting said medium to a blowing action.

It further consists in certain other novel constructions, combinations, and arrangements of parts, as will be hereinafter fully described and claimed.

In the accompanying drawings, Figure 1 represents a diagrammatic view indicating an embodiment in elevation of the present invention. Fig. 2 is a similar view indicating the same elements in plan. Fig. 3 is a view in side elevation of a filter of the preferred construction, some of the filter-plates being shown in section for illustrating the arrangement of the filtering medium.

In carrying out the present invention I preferably employ, as indicated in Fig. 1 of the drawings, a vertical hollow standard 1, divided intermediate its length by a suitable partition 2, any suitable compressed-air pump 3 communicating with the upper end of said standard, and any preferable type of suction-pump 4 is suitably connected with the lower end of the standard. The standard 1 is provided with a suitable connection 5, upon which it is rotatably mounted, the said connection communicating with pump 4 and being supported by any suitable bracket or other supporting means 6. The upper end of standard 1 is provided with a connection 7, similar in construction to connection 5, communicating through a tube 8 with the pump 3, whereby said standard is free to rotate upon its central axis and carry the device supported thereby, while at the same time maintaining established communication with the said pumps.

Surrounding the standard 1 are receptacles 9 and 10 and a discharge-chute 11, forming a circle about said standard. Extending from the standard is a bracket 12, provided at its outer end with a pulley 13 and intermediate its length with a second pulley 14, adapted to receive and guide a cable 15, which cable has its inner end attached to a sliding block 16, slidably engaging the standard 1 and attached to a piston 17 of a cylinder 18. A cylinder 19 is preferably arranged in a lower horizontal plane than the cylinder 18 and has its piston 20 extending in the vertical plane of the cable 15 and carrying a pulley 21, adapted to engage said cable. The cylinders 18 and 19 are carried by the standard 1 and move therewith. Any suitable gearing (not shown) may be employed for rotating the standard 1, or the same may be rotated manually, as found preferable. The outer end of cable 15 is attached to a bail 22, carrying a filter proper, which filter comprises a series of plates 23 23, each provided upon each side thereof with a gauze or metallic mesh 24, outside of which is secured a suitable strip of fabric 25, forming the filtering medium. At the lower end of each plate is provided an aperture 26, communicating with a tube 27, which tube in operation communicates with a common discharge-tube 28. The tube 28 communicates through a flexible tubing with a valve 29, which in turn may be caused to communicate either with a tube 30, leading into the section of standard 1 above partition 2, or may be caused to communicate with a tube 31, leading into the section of standard 1 beneath said partition, whereby communication between either of the pumps 3 or 4 may be established with the filter by positioning of the valve 29.

In operation the tank or receptacle 9 is filled with the material to be filtered, and the tank 10 is filled with water. The filter proper suspended from cable 15 is lowered into the tank 9 by the upward movement of piston 20 and the downward movement of the piston 17, the same being effected by the release of pressure from cylinder 19 and the admission of pressure to cylinder 18, the pressure being supplied and exhausted from said cylinders in any preferred and well-known manner. The standard 1 is rotated until the filter proper approaches the dividing-wall between the receptacles 9 and 10, when the piston 20 is caused to descend, pulley 21 engaging cable 15 and pressing a portion of the same downwardly, while piston 17 is caused to move upwardly, raising the inner end of the cable, and thereby lifting the filter proper out of tank 9. Continued movement of the standard 1 brings the filter proper over the receptacle 10, when the said filter is lowered thereinto in the same manner in which it was lowered into receptacle 9, standard 1 continuing its rotation until the filter approaches the partition dividing tank 10 from chute 11, when the filter is raised over the said partition and lowered into said chute, continued rotation of the standard 1 bringing said filter into proximity with the chute 11 and tank 9, whereupon it is again raised and then lowered into tank 9, the operation being continuous and, as will be apparent, may be made to be automatic, depending upon the means for driving standard 1 and for controlling the action of the pistons 17 and 20. While the filter is moving through tank 9, over the partition between said tank and the tank 10, through tank 10, and over the partition between said last-mentioned tank and the chute 11 the valve 29 is turned to establish communication between tube 28 and tube 31, whereby a sucking or drawing action is produced upon the interior of the filtering medium, and during the travel of the filter across the chute 11 the tube 28 is caused to communicate, by means of valve 29, with tube 30, whereby a blowing action is effected for discharging the solids which may have collected on the outer surface of the filtering medium.

It will be obvious that although I have specified the details of the particular elements employed in a given embodiment of the present invention, yet it is not necessary to use the precise construction mentioned for accomplishing the results by the principle involved, and I shall feel at liberty to deviate from the minor details of structure to any extent within the spirit and scope of the present invention.

Although I have described one particular form of filter, it will be obvious that other forms may be employed of any preferred construction suitable for the operation accomplished in the present invention.

The present application contains such claims only as are directed to the structure herein set forth, the more generic claims for the means for introducing and removing the filtering medium into and from the material to be filtered and for producing a drawing and blowing action on the said medium being presented by me in a copending application which was filed on the 30th day of October, 1902, and designated by Serial No. 129,432.

Although I have illustrated cylinders 18 and 19 and described the operation of the parts thereby, it will of course be understood that I do not limit myself thereto, but may substitute electrical devices or other suitable power means.

Having thus fully described my invention, what I claim as new, and desire to secure by Letters Patent, is—

1. A filter comprising a revolubly-mounted standard, filtering means carried thereby, a tank containing the material to be filtered, an arm projecting from said standard, devices carried by said arm for sustaining said filtering medium and for lowering the same into and removing the same from said receptacle, and mechanism for producing first a drawing and then a blowing action through the filtering medium, substantially as described.

2. A filter comprising a suitable revolubly-mounted hollow standard, a tank containing the material to be filtered, a filter proper carried by said standard, and means for successively bringing said filter proper into and lifting the same out of said tank, and devices for drawing the material from said tank through said filter and through a portion of said standard, and for sending a reverse current through a portion of the standard and filter, substantially as described.

3. A filter comprising a revolubly-mounted standard, filtering means carried thereby, a tank for containing the material to be filtered partially surrounding said standard, devices for lowering said filtering means into and raising the same out of said tank, and mechanism for drawing the material to be filtered through the filtering means and for passing a reverse current through the said filtering means, substantially as described.

4. A filter comprising a revolubly-mounted standard, a tank for containing the material to be filtered and a tank for containing a cleansing liquid partially surrounding said standard, a filter proper carried by said standard, means for raising and lowering said filter, and devices for subjecting the said filter first to a drawing and then to a blowing action, substantially as described.

5. A filter comprising a revolubly-mounted standard, a tank for containing the material to be filtered, a filter proper, means for raising and lowering the same carried by the said standard, and means for subjecting said filter first to a drawing and then to a blowing action, substantially as described.

6. A filter comprising a revolubly-mounted hollow standard, filtering means carried thereby, a suction-pump communicating with said standard, a compressed-air pump also communicating with the standard, and means for establishing communication through the standard between either said suction-pump or compressed-air pump with the filtering means, substantially as described.

7. A filter comprising a revolubly-mounted hollow standard, a partition formed in said standard, a suction-pump communicating with one of said sections, a compressed-air pump communicating with the opposite section thereof, a filtering means carried by said standard, a tube communicating with said filtering means, and a three-way valve common to both sections of said standard, substantially as described.

8. A filter comprising a suitable hollow standard, a partition formed therein dividing the standard into two sections, a suction-pump communicating with one section, a pump for passing a cleansing-current in an opposite direction to that of the suction-pump communicating with the other section, a filtering device carried by said standard, and means for establishing communication between either of said sections and said filtering device, substantially as described.

9. A filter comprising a suitable revolubly-mounted hollow standard, a tank partially surrounding said standard and adapted to contain the material to be filtered, a filter proper carried by said standard, means for lowering the same into said tank and raising it out of the tank, flexible tubing connecting said standard with said filter, devices for subjecting said standard and said flexible tubing to a drawing action and then to a blowing action, substantially as described.

10. A filter comprising a suitable hollow revolubly-mounted standard, a bracket carried thereby, a cable passed over the outer end of said bracket, a filter proper carried by said cable, means for moving the cable longitudinally, means for drawing the material to be filtered through said filter, and a device for passing a reverse current through the filter, substantially as described.

11. A filter comprising a hollow standard, a partition therein forming the same into two sections, a tube communicating with each section, a filter proper, a tube communicating therewith, a three-way valve for establishing communication between the filter-tube and either of the first-mentioned tubes, a suction-pump communicating with one section of said standard, and means for subjecting the other section thereof to a blowing action, substantially as described.

12. A filter comprising a revolubly-mounted standard, filtering means carried thereby, a tank containing the material to be filtered, a device for lowering said filtering means into and raising the same out of said tank and means for producing filtering action, substantially as described.

13. A filter comprising revolubly-mounted standards, filtering means carried thereby, and means for drawing said material from the filter and through said standard, substantially as described.

14. In a filter the combination with a series of tanks arranged in a circle of a filtering medium, means for successively introducing said filtering medium into and removing it from said tanks, means for subjecting filtering medium to a drawing action and means for subjecting the same to a blowing action.

15. In a filter the combination with a series of tanks arranged in a circle, of a filtering medium, means for successively introducing said filtering medium into and removing it from said tanks and means for producing a filtering action, substantially as described.

16. In a filter the combination with a series of tanks arranged in a circle, of a filtering medium, means for successively introducing the same into and removing it from said tanks, means for producing the filtering action, and means for cleansing said filter, substantially as described.

In testimony whereof I hereunto affix my signature in presence of two witnesses.

GEORGE MOORE.

Witnesses:
A. L. HOPPAUGH,
J. B. HAWKES.